(12) United States Patent
Manji et al.

(10) Patent No.: US 11,516,963 B2
(45) Date of Patent: Dec. 6, 2022

(54) WORK VEHICLE

(71) Applicant: Kubota Corporation, Osaka (JP)

(72) Inventors: Yasuhiro Manji, Sakai (JP); Yuto Akai, Sakai (JP); Yu Hayashi, Sakai (JP)

(73) Assignee: Kubota Corporation

( * ) Notice: Subject to any disclaimer, the term of this patent is extended or adjusted under 35 U.S.C. 154(b) by 263 days.

(21) Appl. No.: 15/825,327

(22) Filed: Nov. 29, 2017

(65) Prior Publication Data

US 2018/0160619 A1 Jun. 14, 2018

(30) Foreign Application Priority Data

Dec. 12, 2016 (JP) ............................. JP2016-240527

(51) Int. Cl.
*A01D 34/00* (2006.01)
*A01D 34/68* (2006.01)
(Continued)

(52) U.S. Cl.
CPC .......... *A01D 34/008* (2013.01); *A01B 69/001* (2013.01); *A01D 34/6818* (2013.01); *G05D 1/0219* (2013.01); *G05D 1/0234* (2013.01); *G05D 1/0236* (2013.01); *G06T 7/74* (2017.01); *G06V 20/58* (2022.01); *G06V 20/588* (2022.01); *A01D 34/64* (2013.01); *B60W 2552/25* (2020.02); *B60W 2554/00* (2020.02); *B60Y 2200/223* (2013.01); *G05D 2201/0208* (2013.01); *G06T 2207/10021* (2013.01); *G06T 2207/30256* (2013.01)

(58) Field of Classification Search
None
See application file for complete search history.

(56) References Cited

U.S. PATENT DOCUMENTS 3,924,389 A * 12/1975 Kita ................... B60L 50/16
56/DIG. 15
3,946,825 A * 3/1976 Gail .................... A01B 69/008
180/401

(Continued)

FOREIGN PATENT DOCUMENTS

| JP | 6168024 A | 6/1994 |
| JP | 10307627 A | 11/1998 |
| JP | 2013070685 A | 4/2013 |

*Primary Examiner* — David P. Merlino
(74) *Attorney, Agent, or Firm* — The Webb Law Firm

(57) ABSTRACT

A work vehicle includes a first detection unit that detects an optical beam emitted from a beam projector disposed at one end of a reference travel path, a first position deviation calculation section that calculates position deviation by a vehicle body from the reference travel path based on a detection signal from the first detection unit, a second detection unit that detects a work boundary line that occurs due to work travel, a second position deviation calculation section that calculates position deviation of the vehicle body traveling along successive travel paths from the work boundary line based on a detection signal from the second detection unit, and a steering information generation section that, based on the position deviation calculated by the first position deviation calculation section and the second position deviation calculation section, generates steering information for correcting the position deviation.

6 Claims, 5 Drawing Sheets

(51) Int. Cl.
- *G05D 1/02* (2020.01)
- *G06T 7/73* (2017.01)
- *A01B 69/00* (2006.01)
- *G06V 20/58* (2022.01)
- *G06V 20/56* (2022.01)
- *A01D 34/64* (2006.01)

(56) References Cited

U.S. PATENT DOCUMENTS

| | | | | |
|---|---|---|---|---|
| 4,482,960 A | * | 11/1984 | Pryor | A01B 69/008 172/3 |
| 4,706,773 A | * | 11/1987 | Reinaud | A01B 69/001 172/5 |
| 4,777,785 A | * | 10/1988 | Rafaels | A01D 34/008 56/10.2 A |
| 5,239,249 A | * | 8/1993 | Ono | G05D 1/0236 180/169 |
| 5,911,669 A | * | 6/1999 | Stentz | A01D 41/1278 56/10.2 F |
| 6,721,453 B1 | * | 4/2004 | Benson | G05D 1/0221 382/199 |
| 10,705,533 B1 | * | 7/2020 | Bishel | G05D 1/0231 |
| 2006/0106507 A1 | * | 5/2006 | Ledet | G05B 19/4207 701/23 |
| 2008/0039974 A1 | * | 2/2008 | Sandin | G05D 1/0225 700/258 |
| 2009/0228166 A1 | * | 9/2009 | Durkos | G05D 1/0246 701/26 |
| 2011/0118926 A1 | * | 5/2011 | Peake | G01C 21/34 701/25 |
| 2011/0125358 A1 | | 5/2011 | Biber et al. | |
| 2011/0169949 A1 | * | 7/2011 | McCain | G01B 11/022 348/137 |
| 2012/0323420 A1 | * | 12/2012 | Koike | B62D 6/04 701/22 |
| 2017/0054948 A1 | * | 2/2017 | Angel | G06K 9/00791 |

* cited by examiner

WORK VEHICLE

CROSS-REFERENCE TO RELATED APPLICATION

This application claims priority to Japanese Patent Application No. 2016-240527 filed Dec. 12, 2016, the disclosure of which is hereby incorporated in its entirety by reference.

BACKGROUND OF THE INVENTION

1. Field of the Invention

The present invention relates to a work vehicle that works while traveling along a reference travel path and thereafter works while traveling along a plurality of successive travel paths that are parallel to the reference travel path.

2. Description of the Related Art

JP 6-168024 A discloses a work vehicle guidance apparatus that utilizes an optical beam. This work vehicle guidance apparatus includes optical beam projection means disposed in a work area and light receiving means and control means provided in the work vehicle. The optical beam projection means projects an optical beam for guidance from one end of a work leg toward the other end in each of a plurality of parallel work legs. The light receiving means receives the optical beam that is projected from the optical beam projection means. The control means controls the work vehicle to automatically travel along the work legs, based on light reception information of the light receiving means. In this work vehicle guidance apparatus, the optical beam projection means must be disposed for each of the plurality of parallel travel paths, and in the case where there are a large number of travel paths, the cost of disposing these optical beam projection means becomes a problem.

JP 10-307627 A discloses an auto-travel work vehicle that detects the boundary between a worked region and an unworked region, by using an average brightness difference to digitize captured images acquired by capturing the state of the work area for a predetermined range forward in the direction in which the vehicle body is traveling using image capturing means, and whose vehicle body automatically travels along the boundary based on this boundary detection result. With this auto-travel work vehicle, in the case where the initial work travel cannot be undertaken as planned for some reason, the boundary between the worked region and the unworked region that forms the basis for subsequent automatic travel will no longer be as planned. Thus, there is a problem in that, in the case where an unfavorable travel trajectory occurs in the initial travel, that unfavorability is also carried on in subsequent travel.

In view of the abovementioned situation, there is a need for a work vehicle that realizes accurate work travel, through travel along a reference travel path and work travel along a plurality of successive travel paths that are parallel to the reference travel path.

SUMMARY OF THE INVENTION

In order to work while traveling along a reference travel path and thereafter work while traveling along a plurality of successive travel paths that are parallel to the reference travel path, a work vehicle according to the present invention includes a first detection unit that detects an optical beam emitted from a beam projector disposed at one end of the reference travel path, a first position deviation calculation section that calculates position deviation by a vehicle body from the reference travel path, based on a detection signal from the first detection unit, a second detection unit that detects a work boundary line that occurs due to work travel, a second position deviation calculation section that calculates position deviation of the vehicle body traveling along the successive travel paths from the work boundary line, based on a detection signal from the second detection unit, and a steering information generation section that, based on the position deviation calculated by the first position deviation calculation section and the second position deviation calculation section, generates steering information for correcting the position deviation.

According to this configuration, a beam projector is installed at one end of a reference travel path that forms the basis for successive travel paths, in the case of a work vehicle working while traveling along parallel travel paths that are planned in order to perform work in a work area. When traveling on this reference travel path, accurate work travel along the reference travel path is realized, as a result of the vehicle body being steered so as to correct position deviation that is calculated by detecting the optical beam that is emitted from the beam projector. Furthermore, when traveling along a travel path (successive travel path) that is adjacent to this reference travel path after this initial work travel, position deviation of the vehicle body from a work boundary line that was created in the initial work travel and indicates the boundary between the work area and the unworked area is calculated, from the result of detecting the work boundary line. By steering the vehicle body so as to correct the calculated position deviation from the work boundary line, accurate work travel along the work boundary line is realized. Thereafter, work can be performed as planned throughout the entire work area, by steering the vehicle body while correcting position deviation of the vehicle body calculated based on a work boundary line that has been newly created. Work travel without unnecessary work overlap or unfinished work is realized, using a combination of steering control that is based on the guidance of an optical beam that is used when traveling the reference travel path, and steering control that is based on a detection result of the work boundary line that is used when traveling a successive travel path.

In one favorable embodiment of the present invention, the first detection unit includes an image sensor that detects the optical beam, and the second detection unit includes an image sensor that acquires an image of the work boundary line. With this configuration, position deviation of the vehicle body is calculated, by performing image processing of captured images acquired by image sensors that are used in the first detection unit and the second detection unit. Commonalization or integration of these image processing control systems thus becomes possible, and the control configuration is simplified.

In a more preferable embodiment, the first detection unit and the second detection unit are commonalized as a single photographic camera. In other words, this photographic camera acquires captured images in which the optical beam from the beam projector is contained within the captured field of view, when the vehicle body is traveling on the reference travel path, and acquires captured images in which the work boundary line is contained within the captured field of view, when the vehicle body is traveling on the successive travel paths.

In the case where the photographic camera fixed to a predetermined position of the vehicle body is, in the attitude in which it is fixed, unable to take in both the optical beam from the beam projector and the work boundary line, the captured field of view of the photographic camera is configured to switch between a first captured field of view in which the optical beam from the beam projector can be taken in by the photographic camera so as to function as the first detection unit and a second captured field of view in which the work boundary line can be taken in so as to function as the second detection unit. A camera attitude change mechanism and a mirror mechanism are used in order to change this captured field of view. Of course, in the case where the photographic camera fixed to a predetermined position of the vehicle body is able to take in both the optical beam from the beam projector and the work boundary line by using a wide-angle lens or the like, the captured field of view will not need to be changed, and the configuration of the photographic system is further simplified.

The present invention is applicable to work vehicles that are driven automatically and work vehicles that are driven manually. Work vehicles that are driven automatically are provided with a steering control section that automatically steers the vehicle body based on the steering information.

Also, work vehicles that are driven manually are provided with a function of providing guidance of position deviation of the vehicle body, based on the steering information. For example, work travel is realized as planned, by the driver performing a steering operation so as to correct position deviation that is displayed on a monitor. Notification of position deviation of the vehicle body may be auditory notification using a speaker or the like, instead of visual notification using a monitor, or may be both visual and auditory notification.

Other features and advantages of the present invention will become clear from the following description with reference to the drawings.

DETAILED DESCRIPTION OF PREFERRED EMBODIMENTS

Figure 1:
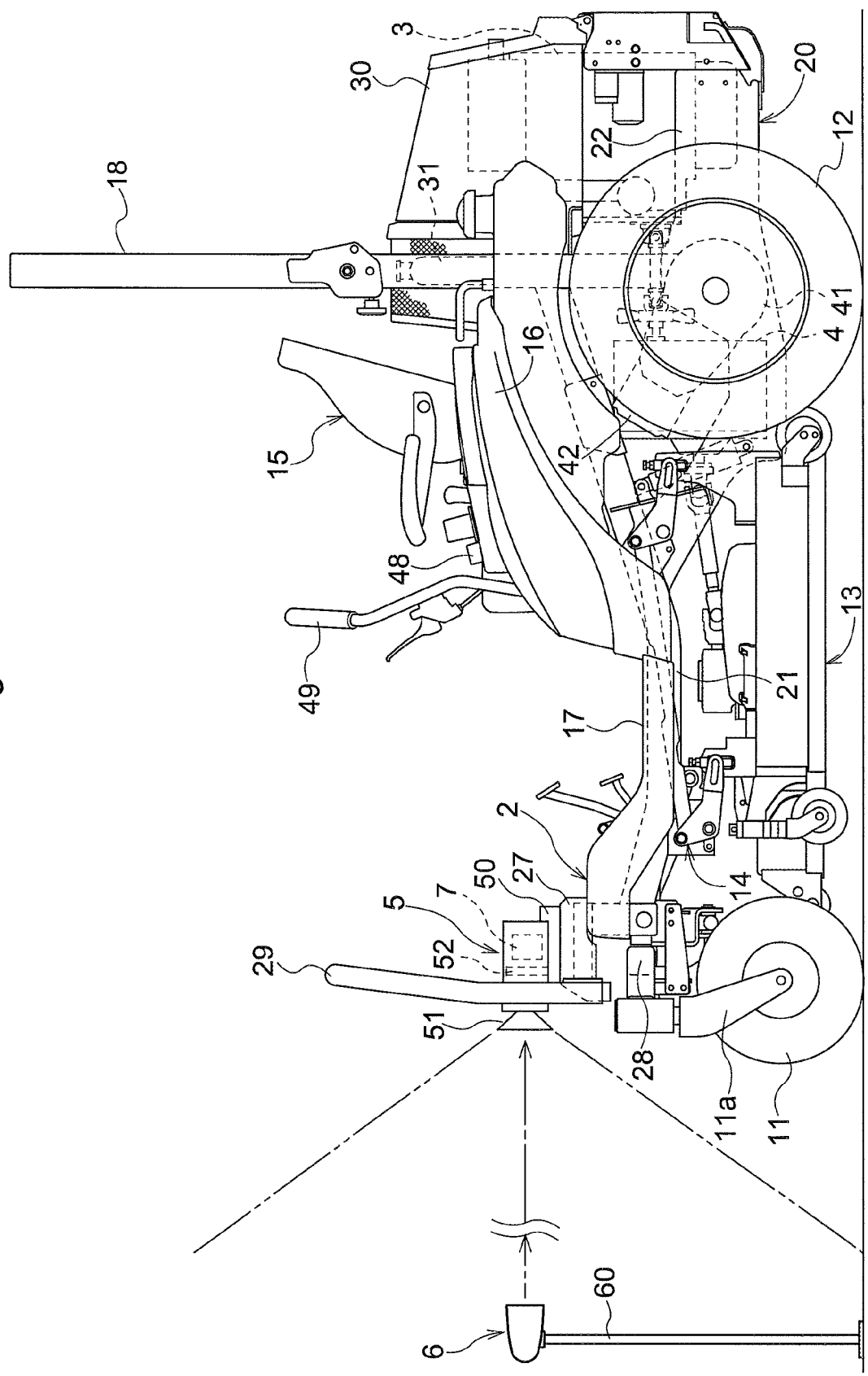
FIG. 1 is a side view of a ride-on mower serving as an example of a work vehicle according to an exemplary embodiment.
Figure 2:
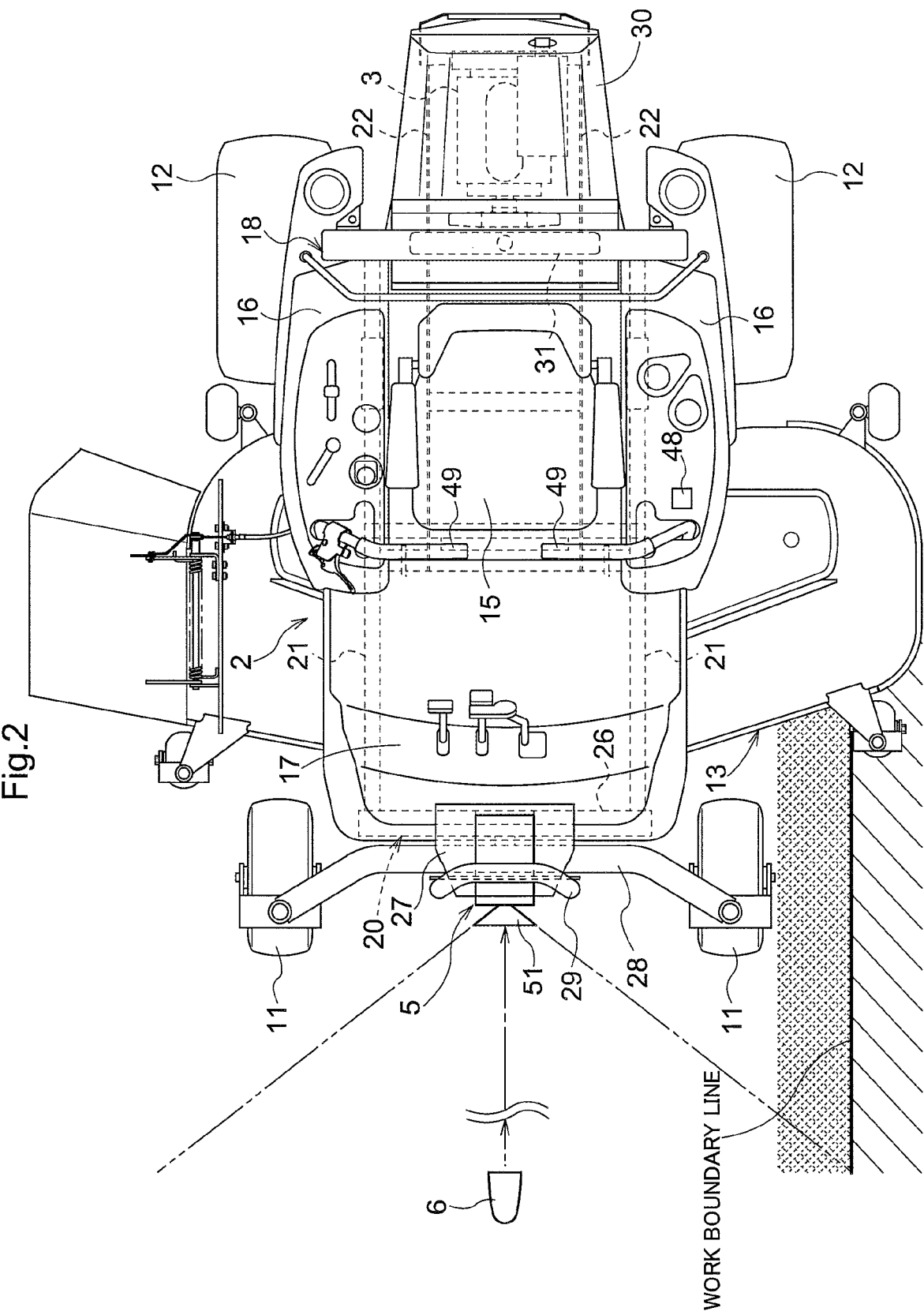
FIG. 2 is a plan view of the ride-on mower.

A specific embodiment of a work vehicle according to the present invention will be described next with reference to the drawings. In the illustrated embodiment, the work vehicle is a ride-on mower equipped with a mower unit 13 as a work apparatus (work implement). FIG. 1 is a side view of the ride-on mower, and FIG. 2 is a plan view thereof.

[Overall Configuration of Ride-on Mower]

A vehicle body 2 of the ride-on mower is ground-supported by a right/left pair of front wheels 11 and a right/left pair of rear wheels 12. This ride-on mower is also called a zero turn mower, with the front wheels 11 being caster-type wheels and the rear wheels 12 being drive wheels that are rotationally driven independently of each other. The vehicle body 2 has a vehicle body frame 20 as a base member, and the mower unit 13 is suspended from the vehicle body frame 20 via a link mechanism 14, between the front wheels 11 and the rear wheels 12. A driver seat 15 is disposed in a central region (driving section) of the vehicle body in the front/rear direction of the vehicle body 2. A ROPS (rollover protection structure) 18 is provided behind the driver seat 15. An engine 3 is disposed in a rear end region of the vehicle body 2. Engine accessories such as a radiator 31 are disposed forward of the engine 3, and the engine 3 and the engine accessories are covered from above by a hood 30. Note that a battery and an electric motor may be used as the power source, instead of the engine 3. Furthermore, fenders 16 are formed on the right and left side surfaces of the driver seat 15. A step 17 is placed forward of the driver seat 15.

A transmission 4 is disposed on the front side of the engine 3. A right/left pair of rear axle transmission units 41 are included in the transmission 4. Independently operable hydrostatic transmissions 42 (abbreviated as HSTs 42 hereinafter) are respectively housed in the right and left rear axle transmission units 41 as an example of a continuously variable transmission mechanism. The HSTs 42 is configured to transmit engine power to the respective rear wheels 12, by continuously changing from low speed to high speed, in a forward rotation (forward movement) state and a reverse rotation (rearward movement) state. Whereby, straight forward movement is created by driving both the right and left rear wheels 12 in the forward direction at the same or substantially same speed, and straight rearward movement is created by driving both the right and left rear wheels 12 in the reverse direction at the same or substantially same speed. Furthermore, the vehicle body 2 can be turned in an arbitrary direction by differentiating the speeds of the right and left rear wheels 12, and can, for example, be tightly turned by operating one of the rear wheels 12 at a speed close to zero and operating the other rear wheel 12 at high speed on the forward movement side or the rearward movement side. Furthermore, the vehicle body 2 can also be made to do a spin turn with the substantial middle portion between the right and left rear wheels 12 as the center (pivot) of rotation, by driving the right and left rear wheels 12 in opposite directions. Because the right/left pair of front wheels 11 are constituted by caster wheels to allow orientation thereof to be freely changed around respective vertical axes, the orientation will be corrected according to the travel direction that results from driving the right and left rear wheels 12.

A manual shift (change-speed) operation on the right and left HSTs 42 is performed by a right/left pair of shift levers 49 disposed on both sides of the driver seat 15. The continuously variable transmission enters a neutral stopped state when the shift levers 49 are held in a neutral position in the front/rear direction, a forward shift is realized by the shift levers 49 being operated forward from the neutral position, and a rearward shift is realized by the shift levers 49 being operated rearward. As described above, an automatic transmission operation on the right/left HSTs 42 is also possible, and automatic steering along a planned travel path is thereby realized.

As shown with dotted lines in FIG. 2, the vehicle body frame 20 includes a right/left pair of front frames 21 and a right/left pair of rear frames 22; and the right and left front frames 21 are coupled by a front cross beam unit 26 that comprises a plurality of cross beams. The right and left frames 22 are similarly coupled by a rear cross beam unit that comprises a plurality of cross beams, although the rear cross beam unit is not shown. An engine mount region for disposing the engine 3 is formed in the rear end region of the rear frames 22.

A front wheel support arm 28 that extends in the transverse direction of the vehicle body is provided in the front cross beam unit 26 that is located in the front end of the vehicle body 2. A head cover 27 is provided in the middle of the front cross beam unit 26, and a reverse U-shaped front guard 29 stands erect via the head cover 27. Each of the front wheels 11 is attached to an either end of the front wheel support arm 28 associated therewith via a caster bracket 11*a*.

[Travel Management of Ride-on Mower]

The ride-on mower works while traveling (mows while traveling) along a reference travel path that extends in a straight line in a work area (grass area), and a large number of successive travel paths extending parallel to the reference travel path. U-turns, switchback turns and the like are used in travel transition from the reference travel path to a successive travel path, and travel transition from a successive travel path to a successive travel path. An image processing technology is used, in order to detect position deviation of the vehicle body 2 on the reference travel path and the successive travel paths.

In particular, a photographic camera 5 that acquires captured images, used in image processing for detecting position deviation of the vehicle body 2, is provided upward of the head cover 27 via a camera mount 50. In the instant embodiment, the photographic camera 5 includes a lens unit 51, a two-dimensional image sensor 52 and an image processing section 7. The photographic central axis (optical axis) of this photographic camera 5 extends horizontally in the travel direction of the ride-on mower. Furthermore, a beam projector 6 is provided at the upper portion of a support pole 60 installed on the ground at one end of the reference travel path. The beam projector 6 is positioned such that the optical beam (e.g., laser beam, LED (light emitting diode) beam) from the beam projector 6 comes into alignment (or substantially alignment) with the photographic central axis of the photographic camera 5.

Furthermore, at the time of working while traveling along a successive travel path, the lens unit 51 is selected such that a work boundary line, that is formed between a grass area mown by the mower unit 13 and a grass area that has not yet been mown, enters the captured field of view of this photographic camera 5. In other words, in this embodiment, the two-dimensional image sensor 52 of the photographic camera 5 functions as both a first detection unit and a second detection unit of the instant invention.

[Functional Blocks of Steering Control System]

Figure 3:
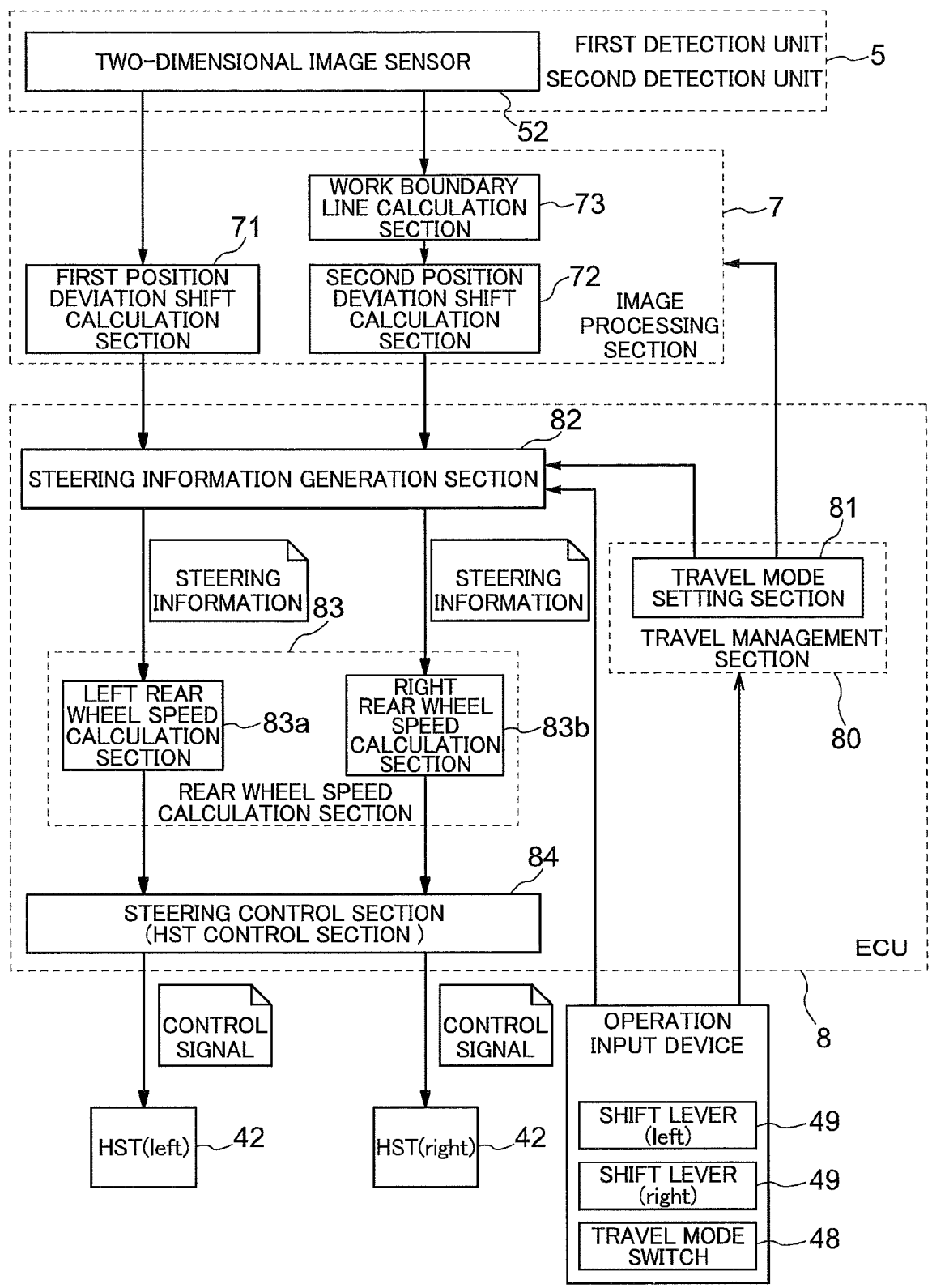
FIG. 3 is a functional block diagram showing a control system for working while traveling along a travel path.

FIG. 3 shows a functional block diagram of a steering control system that uses the photographic camera 5. The image processing section 7 functions to perform two different types of image processing, i.e. image processing for the reference travel path and image processing for the successive travel paths, based on the image signal acquired with the two-dimensional image sensor 52. Image processing for the reference travel path is executed with a first position deviation calculation section 71, and image processing for the successive travel paths is executed with a second position deviation calculation section 72 and a work boundary line calculation section 73.

The first position deviation calculation section 71 calculates the position deviation of the vehicle body 2 from the reference travel path, based on an image signal which is the detection signal of the two-dimensional image sensor 52. As described above, the beam center of the optical beam and the photographic central axis of the photographic camera 5 are aligned with each other. Thus, if the vehicle body 2 is accurately located on the reference travel path, an image of the point irradiated by the optical beam is generated at a specific position (central position) of the two-dimensional image sensor 52. And, deviation from the central position of the irradiated point corresponds to position deviation of the vehicle body 2 from the reference travel path.

The work boundary line calculation section 73 calculates a work boundary line (boundary line between unmown area and mown area) that is generated resulting from the work travel, by performing boundary detection processing, that is well-known per se, on the image signal of the two-dimensional image sensor 52. The second position deviation calculation section 72 determines, based on the positional relationship between the calculated work boundary line and the vehicle body 2, whether the mowing region of the mower unit 13 covers an unmown area including a predetermined amount of overlap, and calculates the position deviation of the vehicle body 2, that travels along a successive travel path, from the work boundary line.

An ECU (electronic control unit) 8 is provided as a core member of an electronic control system of this ride-on mower; and in this embodiment, a travel management section 80, a steering information generation section 82, a rear wheel speed calculation section 83, a steering control section 84 and the like are built in the ECU 8. A travel mode setting section 81 that is included at the travel management section 80 sets one of a "reference travel mode" in which the vehicle body 2 travels automatically along the reference travel path, a "successive travel mode" in which the vehicle body 2 travels automatically along a successive travel path, and a "manual travel mode" in which the vehicle body 2 travels manually using the shift levers 49. A travel mode switch 48 for manually setting the travel mode is provided adjacent the driver seat 15, as one operation input device.

The steering information generation section 82 receives position deviation on the reference travel path calculated by the first position deviation calculation section 71 and position deviation on successive travel paths calculated by the second position deviation calculation section 72, and generates steering information for correcting the position deviation. The steering information includes appropriate steering data for correcting the position deviation, such as the steering angle, for example. A table for deriving steering data depending on the amount of position deviation is provided in the steering information generation section 82.

With this ride-on mower, the steering angle of the vehicle body 2 is determined by the difference in speed (rotation difference) between the right and left rear wheels 12, and thus the steering information is sent to the rear wheel speed calculation section 83. The rear wheel speed calculation section 83 derives the rotation difference between the right and left rear wheels 12 required for position deviation correction from the received steering information; and the number of rotations of the right and left rear wheels 12 for creating the rotation difference is respectively calculated with a left rear wheel speed calculation section 83*a* and a right rear wheel speed calculation section 83*b*.

The results of calculation by the left rear wheel speed calculation section 83*a* and the right rear wheel speed calculation section 83*b* are sent to the steering control section 84, which is configured as an HST control section in this embodiment. The steering control section 84 generates a control signal (swash plate adjustment signal) and sends the generated control signal to the left HST 42 and the right HST 42.

[Example of Steering Control Routine]

With this ride-on mower, different steering control (steer control) is respectively performed in the "reference travel mode", the "successive travel mode" and the "manual travel mode". Switching of the travel modes is, in this embodiment, performed by the travel mode switch 48.

Figure 4:
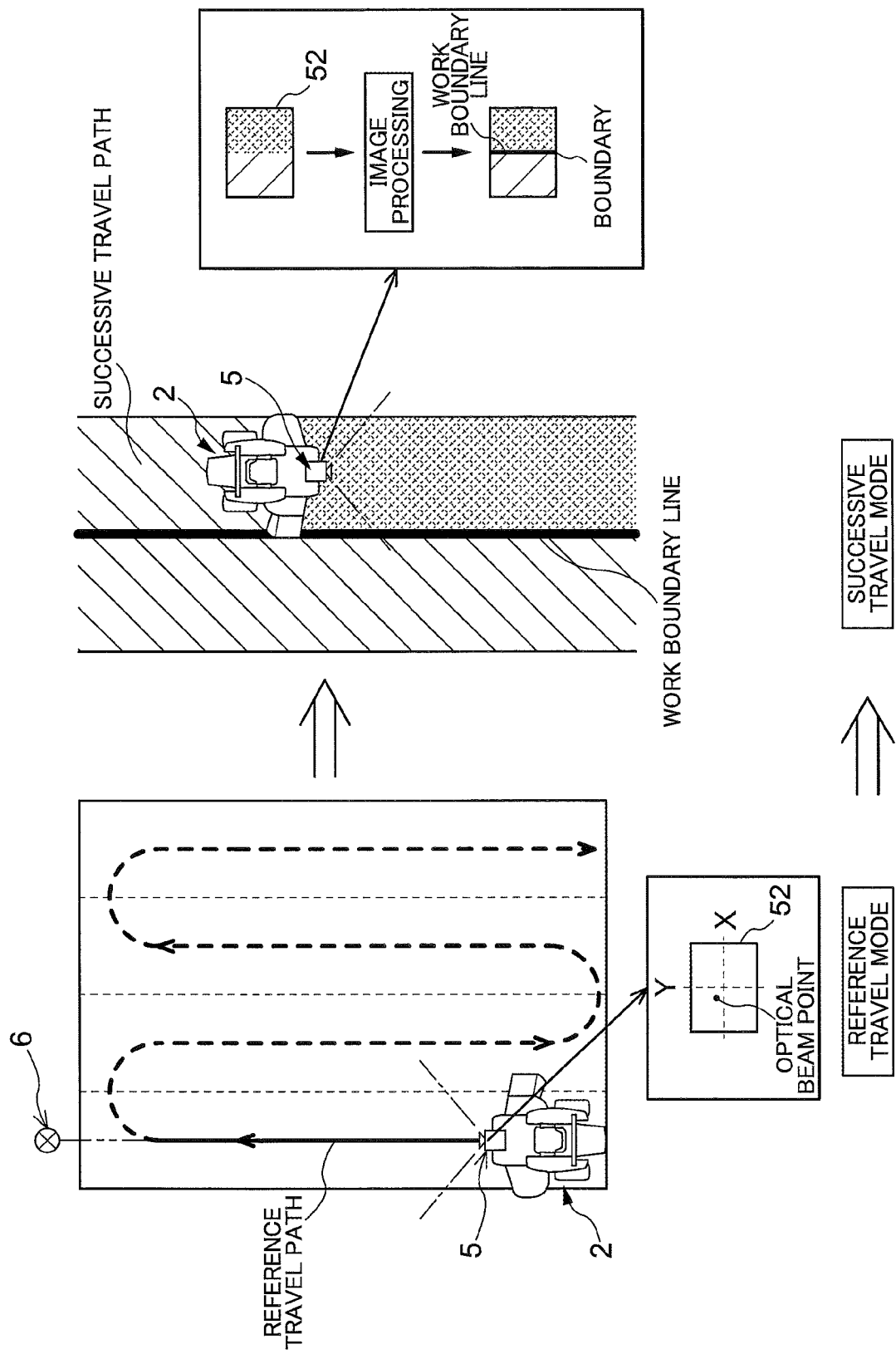
FIG. 4 is an illustrative diagram showing the flow of control for working while traveling along a travel path.
Figure 5:
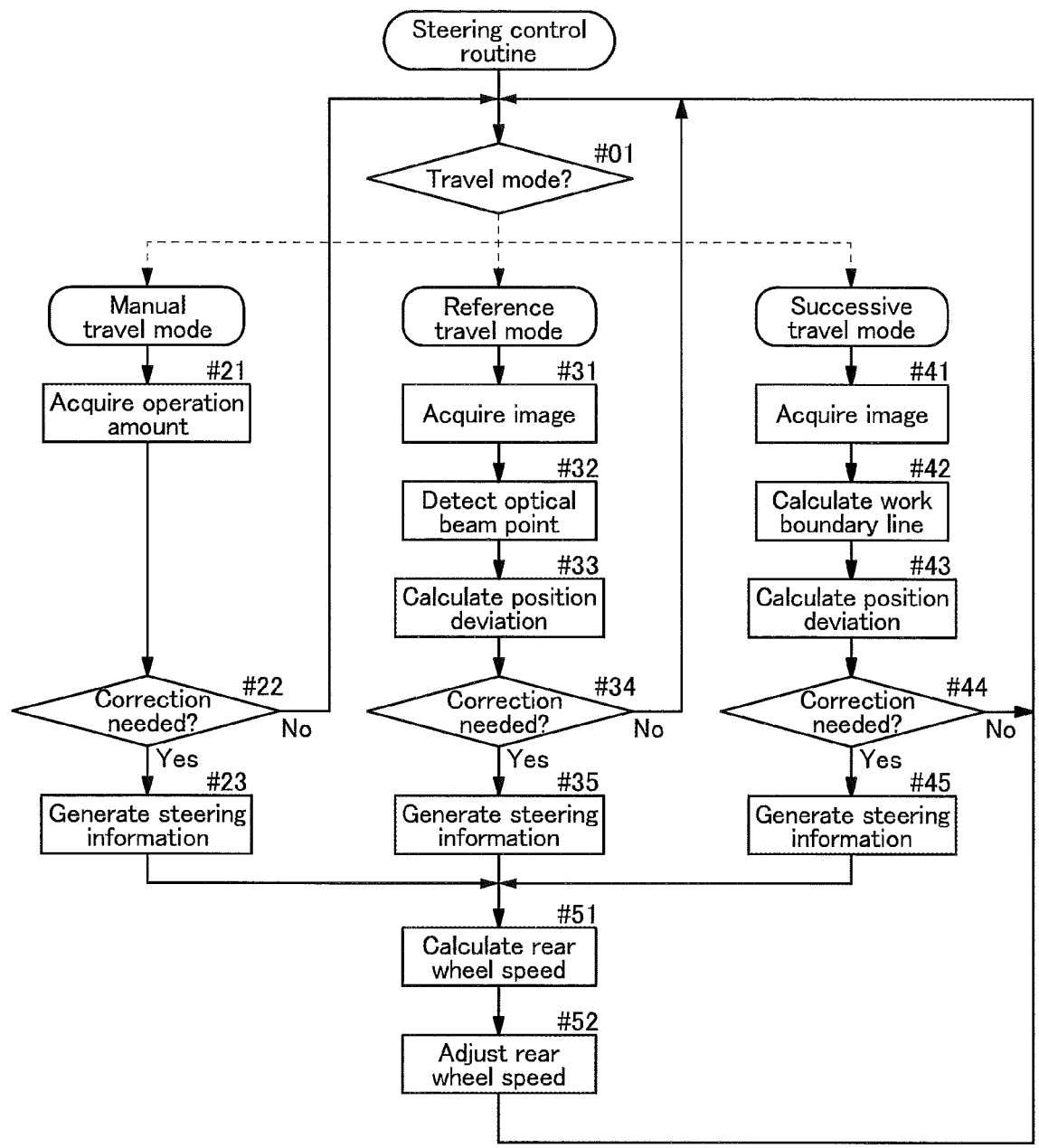
FIG. 5 is a flowchart showing an example of a steering control routine.

With reference to FIGS. 4 and 5, an example of a steering control routine will be described next. The "reference travel mode" and the "successive travel mode" are travel modes that are used selectively, with travel in the "successive travel mode" being performed after traveling in the "reference travel mode". FIG. 4 is a schematic diagram illustrating steering control that transitions from travel in the "reference travel mode" to travel in the "successive travel mode", and FIG. 5 is a flowchart showing an example of the steering control routine.

As shown in FIG. 4, travel in the "reference travel mode" is travel in a straight line along a planned reference travel path, and thus the beam projector 6 is installed at one end of the reference travel path. Initially, in the "manual travel mode", the vehicle body 2 is positioned such that the irradiated point of the optical beam is appears on the two-dimensional image sensor 52 of the photographic camera 5. Thereafter, upon switching from the "manual travel mode" to the "reference travel mode", the first position deviation calculation section 71 and the steering information generation section 82 function to realize accurate travel in a straight line along the reference travel path guided by the optical beam. Upon reaching the end point of the reference travel path, the travel mode is switched to the "manual travel mode", U-turn travel or switchback travel is performed, and the ride-on mower transitions to a successive travel path serving as a virtual travel path that is adjacent to the reference travel path. In this embodiment, a successive travel path is a travel path for working while travelling through the next mowing region (next work region) which has the work boundary line, which is the boundary between the mown area and the unmown area, along one edge. Upon transition to such a successive travel path, the travel mode switches to the "successive travel mode". Whereby, the second position deviation calculation section 72, the work boundary line calculation section 73 and the steering information generation section 82 function to realize accurate travel in a straight line along the successive travel path, i.e. along the work boundary line. Upon reaching the end point of this successive travel path, the travel mode switches to the "manual travel mode", U-turn travel or switchback travel is performed, the ride-on mower transitions to the next successive travel path to enter the "successive travel mode" again. Thereafter, mowing work for the entire mowing area is completed by the repetition of the "manual travel mode" and the "successive travel mode".

[Description of Flowchart]

With reference to the flowchart in FIG. 5, the steering control using the photographic camera 5, the image processing section 7 and the ECU 8 will be briefly described next.

[Manual Travel Mode]

In this steering control routine, first, the travel mode that is currently set is checked (#01). When the "manual travel mode" is currently set, steering control for manual travel from step #21 to step #23 is executed. In this steering control for manual travel, the operational amount of the right/left pair of shift levers 49 is acquired (#21). It is checked whether the orientation of the vehicle body 2 needs to be corrected, based on the acquired operation amount (#22). If correction is needed (#22: Yes branch), steering information is generated (#23), and calculation and adjustment of the rear wheel speed are performed by the rear wheel speed calculation section 83 and the steering control section 84 (#51, #52).

On the other hand, if the check of step #22 indicates that correction is not needed (#22: No branch), the processing returns to step #01 to check the travel mode that is currently set.

[Reference Travel Mode]

When the check of step #01 indicates that the "reference travel mode" is currently set, steering control for reference travel from step #31 to step #35 is executed.

In this steering control for reference travel, an image that includes the irradiated point of the optical beam is acquired from the two-dimensional image sensor 52 (#31). The coordinate position of the optical beam point is calculated by image processing (#32), and position deviation of the vehicle body 2 on the reference travel path is calculated by the first position deviation calculation section 71 (#33). It is checked whether the orientation of the vehicle body 2 needs to be corrected, based on the calculated position deviation (#34). If correction is needed (#34: Yes branch), steering information is generated (#35), and calculation and adjustment of the rear wheel speed are performed by the rear wheel speed calculation section 83 and the steering control section 84 (#51, #52).

On the other hand, if the check of step #34 indicates that correction is not needed (#34: No branch), the processing returns to step #01 to check the travel mode that is currently set.

[Successive Travel Mode]

When the check of step #01 indicates that the "successive travel mode" is currently set, steering control for successive travel from step #41 to step #45 is executed.

In this steering control for successive travel, an image in which the boundary region between the mown area and the unmown area appears is acquired from the two-dimensional image sensor 52 (#41). The work boundary line, which is the boundary line between the mown area and the unmown area, is calculated by the work boundary line calculation section 73 (#42). Because the positional relationship between the mowing region of the mower unit 13 and the calculated work boundary line is obtained from the coordinate position of the work boundary line, position deviation of the vehicle body 2 on the successive travel path is calculated from that positional relationship (#43). It is checked whether the orientation of the vehicle body 2 needs to be corrected, based on the calculated position deviation (#44). If correction is needed (#44: Yes branch), steering information is generated (#45), and calculation and adjustment of the rear wheel speed are performed by the rear wheel speed calculation section 83 and the steering control section 84 (#51, #52).

On the other hand, if the check of step #44 indicates that correction is not needed (#44: No branch), the processing returns to step #01 to check the travel mode that is currently set.

When work on a work area has been implemented in work travel along a reference travel path and successive travel paths such as described above, it is possible to record the vehicle speed and steering executed in that work travel as work travel data. Furthermore, it is also possible to replicate the work travel in the same work area, by reproducing this recorded work travel data.

Other Embodiments

As described above, the present invention is applicable to a work vehicle that implements work travel in a work area by repeating travel on a reference travel path and travel on travel paths that are based on the reference travel path.

Also, a plurality of the other embodiments that will each be described below can be selected and applied to the above embodiment as long as inconsistencies do not occur. Note that the scope of the present invention is not limited to the contents shown in the embodiments.

(1) In the foregoing embodiment, directional change travel such as U-turn travel and switchback travel for transition from the reference travel path to an adjacent successive travel path and for transition from a successive travel path to an adjacent successive travel path is performed in the "manual travel mode". However, it is also possible to provide an "automatic directional change travel mode" in which such directional change travel is performed automatically. This "automatic directional change travel mode" can be realized by creating directional change steering information for that purpose in advance, with consideration for the work width and the turning radius of the work vehicle, and supplying directional change steering information to the rear wheel speed calculation section 83, triggered by the signal from a sensor that detects travel of a predetermined distance or the path end, or the like.

(2) In the foregoing embodiment, work travel in the "reference travel mode" and the "successive travel mode" is performed automatically, but instead guidance information for notifying position deviation to the driver may be created, based on the generated steering information, and semiautomatic travel in which position deviation is corrected by the driver steering the work vehicle based on this guidance information may be employed.

In other words, work vehicles that are manually driven are provided with a function of providing guidance of position deviation of the vehicle body, based on the steering information. Although not illustrated, this guidance function can, for example, be realized by displaying position deviation of the vehicle body to the driver on a monitor. Alternatively, instead of visual notification (guidance) using a monitor, auditory notification (guidance) using a speaker or the like or both visual and auditory notification may be employed.

(3) In the foregoing embodiment, the image processing section 7 is attached to the photographic camera 5, but the image processing section 7 may naturally be incorporated in the ECU 8, or the image processing section 7 may be built as a stand-alone device between the photographic camera 5 and the ECU 8. Also, the photographic camera 5 may be realized as a control unit, and the photographic camera 5, the image processing section 7 and the steering information generation section 82 may be incorporated within that unit.

(4) In the foregoing embodiment, the first detection unit that detects the optical beam and the second detection unit that detects the work boundary line are commonalized, and are both realized by a single photographic camera 5. Instead, the first detection unit and the second detection unit may be constituted by separate photographic cameras 5. Alternatively, an attitude change mechanism that switches the captured field of view of a single photographic camera 5 between a first captured field of view and a second captured field of view may be provided, and a camera attitude (first captured field of view) that functions as the first detection unit and a camera attitude (second captured field of view) that functions as the second detection unit may be created. Furthermore, a configuration in which the first captured field of view and the second captured field of view are switched using a mirror mechanism may be employed.

(5) In the foregoing embodiment, a steering function is created by changing the difference in speed between the right/left pair of rear wheels 12, but instead a steering function may be created using a steering mechanism. In this case, the steering control section 84 controls the steering mechanism using a motor or the like.

What is claimed is:

1. A work vehicle guidance system comprising:
a single optical beam projector in a single work area, wherein the single optical beam projector is disposed at one end of a reference travel path within the single work area; and
a work vehicle, the work vehicle comprising:
    a vehicle body;
    a pair of right and left drive wheels that supports the vehicle body, the right and left drive wheels being rotationally driven independently of each other;
    a travel mode setting section configured to set one of a reference travel mode in which a vehicle body travels automatically along the reference travel path, a successive travel mode in which the vehicle body travels automatically along a plurality of successive travel paths that extend parallel to the reference travel path, and a manual travel mode in which the vehicle body travels manually, the work vehicle being configured to work while traveling along the plurality of successive travel paths after traveling along the reference travel;
a first detection unit that detects an optical beam emitted from the single optical beam projector disposed at one end of the reference travel path;
    a first position deviation calculation section that calculates first position deviation, from the reference travel path, of the vehicle body based on a first detection signal from the first detection unit;
    a second detection unit that detects a boundary between a worked travel path and an un-worked travel path of the plurality of successive travel paths;
    a work boundary line calculation section that calculates a work boundary line based on the boundary detected between the worked travel path and the un-worked travel path of the plurality of successive travel paths;
    a second position deviation calculation section that calculates second position deviation, from the work boundary line, of the vehicle body traveling along the plurality of successive travel paths based on a second detection signal from the second detection unit;
    a steering information generation section that generates first steering information for correcting the first position deviation based on the first position deviation calculated by the first position deviation calculation section, and generates second steering information for correcting the second position deviation based on the second position deviation calculated by the second position deviation calculation section;
    a drive wheel speed calculation section that derives a rotation speed difference between the right and left drive wheels required for correcting the second position deviation, based on the second steering information generated by the steering information generation section;
    a travel mode switch for manually setting each of the reference travel mode, the successive travel mode, and the manual travel mode; and
    a steering control section that generates a control signal for steering the vehicle body based on the rotation speed difference derived by the drive wheel speed calculation section, wherein:
    when the travel mode setting section sets the reference travel mode, the steering information generation section generates the first steering information for correcting the first position deviation calculated by the first position deviation calculation section, and when the travel mode setting section sets the successive travel mode, the steering information generation section generates the second steering information for correcting the second position deviation calculated by the second position deviation calculation section, wherein in the successive travel mode, each time the work vehicle performs the work travel along one of the plurality of successive travel paths, the second position deviation calculation section calculates a latest second position deviation, based on the work boundary line that is calculated by the work boundary line calculation section after the work travel along a previous successive travel path, wherein the steering information generation section generates the second steering information for correcting the second position deviation based on the latest second position deviation calculated by the second position deviation calculation section, and wherein the first detection unit and the second detection unit are commonalized as a single photographic camera, wherein a captured field of view of the photographic camera is switched between a first captured field of view that functions as the first detection unit and a second captured field of view that functions as the second detection unit.

2. The work vehicle guidance system according to claim 1, further comprising a steering control section that steers the vehicle body automatically based on the first steering information and the second steering information.

3. The work vehicle guidance system according to claim 1, wherein a function of providing guidance of the first position deviation and the second position deviation of the vehicle body based on the first steering information and the second steering information, respectively, is provided.

4. The work vehicle guidance system according to claim 1, wherein each successive travel path extends parallel to, and in an opposite direction from, the previous successive travel path.

5. The work vehicle guidance system according to claim 1, wherein:

the drive wheel speed calculation section includes a left drive wheel speed calculation section that calculates a left number of rotations required for driving the left drive wheel based on the second steering information, and a right drive wheel speed calculation section that calculates a right number of rotations required for driving the right drive wheel based on the second steering information; and the drive wheel speed calculation section is configured to derive the rotation speed difference from a difference between the left number of rotations and the right number of rotations.

6. The work vehicle guidance system according to claim 5, further comprising:

a left continuously variable transmission mechanism configured to adjust the number of rotations for the left drive wheel based on the left number of rotations calculated by the left drive wheel speed calculation section; and a right continuously variable transmission mechanism configured to adjust the number of rotations for the right drive wheel based on the right number of rotations calculated by the right drive wheel speed calculation section.

* * * * *

UNITED STATES PATENT AND TRADEMARK OFFICE
CERTIFICATE OF CORRECTION

PATENT NO. : 11,516,963 B2  
APPLICATION NO. : 15/825327  
DATED : December 6, 2022  
INVENTOR(S) : Yasuhiro Manji et al.

Page 1 of 1

It is certified that error appears in the above-identified patent and that said Letters Patent is hereby corrected as shown below:

On the Title Page

Item (73) Assignee, Line 1, after "Corporation" insert -- (JP) --

Signed and Sealed this
Twenty-fourth Day of January, 2023

Katherine Kelly Vidal
*Director of the United States Patent and Trademark Office*